(12) United States Patent
Hoggarth et al.

(10) Patent No.: US 10,596,942 B2
(45) Date of Patent: Mar. 24, 2020

(54) STOWABLE TABLE ASSEMBLY FOR A VEHICLE

(71) Applicant: FORD GLOBAL TECHNOLOGIES, LLC, Dearborn, MI (US)

(72) Inventors: Marcus Hoggarth, Hertfordshire (GB); Stephen De Saulles, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/257,848

(22) Filed: Jan. 25, 2019

(65) Prior Publication Data
US 2019/0232844 A1 Aug. 1, 2019

(30) Foreign Application Priority Data

Jan. 26, 2018 (GB) .................................. 1801330.0

(51) Int. Cl.
*B60N 3/00* (2006.01)
*B62D 25/20* (2006.01)
*A47B 3/00* (2006.01)

(52) U.S. Cl.
CPC ............ *B60N 3/001* (2013.01); *B62D 25/20* (2013.01); *A47B 3/00* (2013.01)

(58) Field of Classification Search
CPC ............ B60N 3/001; B62D 25/20; A47B 3/00
See application file for complete search history.

(56) References Cited

U.S. PATENT DOCUMENTS 2,833,334 A 5/1958 Hunter, Jr.
3,476,432 A * 11/1969 Manio ...................... B60R 5/04
296/156
3,583,760 A * 6/1971 McGregor ............. A47B 5/006
297/145
4,022,136 A * 5/1977 Schott ...................... A47B 3/00
108/108
5,069,142 A * 12/1991 Matre ...................... A47B 3/02
108/42
5,622,119 A * 4/1997 Hsieh ...................... A47B 3/00
108/115

(Continued)

FOREIGN PATENT DOCUMENTS

DE 19942892 A1 3/2001
KR 20120108299 A 10/2012

OTHER PUBLICATIONS

English Machine Translation of KR20120108299A dated Oct. 5, 2012.

*Primary Examiner* — Hanh V Tran
(74) *Attorney, Agent, or Firm* — David Coppiellie; Price Heneveld LLP (57) ABSTRACT

A stowable table assembly, for a vehicle, includes a cavity providable beneath a floor of the vehicle, an elongate carrier coupled to the cavity, and a table top coupled to the carrier. A first end of the table top is configured to translate and rotate relative to the carrier between an aligned position, in which the table top is aligned with the carrier, and an extended position, in which the table top is at an angle relative to the carrier. The stowable table assembly is in a deployed configuration when the carrier is in the upright position and the table top is in the extended position. The stowable table assembly is in a stowed configuration when the table top is in the aligned position and the carrier is in the stowed position.

15 Claims, 12 Drawing Sheets

(56) References Cited

U.S. PATENT DOCUMENTS

| | | | | |
|---|---|---|---|---|
| 5,687,651 A * | 11/1997 | Hurayt | ............... | B60N 3/001 |
| | | | | 108/44 |
| 5,947,416 A * | 9/1999 | Kraft | ............... | A47B 1/00 |
| | | | | 108/143 |
| 6,135,549 A * | 10/2000 | Demick | ............... | B60N 3/001 |
| | | | | 108/44 |
| 6,145,447 A * | 11/2000 | Henderson | ............... | B60N 3/001 |
| | | | | 108/115 |
| 7,455,016 B2 * | 11/2008 | Perin | ............... | B43L 3/008 |
| | | | | 108/44 |
| 8,485,583 B2 * | 7/2013 | Mather | ............... | B60N 2/3075 |
| | | | | 296/37.14 |
| 10,137,990 B2 * | 11/2018 | Lee | ............... | B64D 11/0638 |
| 10,232,793 B2 * | 3/2019 | Frederick | ............... | B60R 9/06 |
| 10,286,816 B2 * | 5/2019 | Murray | ............... | B60N 2/015 |
| 10,383,434 B2 * | 8/2019 | Enzinger | ............... | B64D 11/0605 |
| 2003/0188672 A1 * | 10/2003 | Parent | ............... | A47B 5/006 |
| | | | | 108/134 |
| 2005/0258672 A1 * | 11/2005 | Schweizer | ............... | A47C 7/70 |
| | | | | 297/145 |
| 2006/0170235 A1 * | 8/2006 | Oilar | ............... | B60N 2/06 |
| | | | | 296/37.14 |
| 2007/0210601 A1 * | 9/2007 | Phillips | ............... | B60N 2/3011 |
| | | | | 296/37.14 |
| 2009/0078169 A1 * | 3/2009 | Osborne | ............... | A47B 5/006 |
| | | | | 108/40 |
| 2013/0147227 A1 * | 6/2013 | Mather | ............... | B60N 2/3075 |
| | | | | 296/65.09 |
| 2014/0305349 A1 * | 10/2014 | Lippert | ............... | B60N 3/001 |
| | | | | 108/44 |
| 2015/0015026 A1 * | 1/2015 | Nojima | ............... | B62D 35/02 |
| | | | | 296/180.1 |
| 2015/0027349 A1 * | 1/2015 | Kahle | ............... | A47B 83/045 |
| | | | | 108/41 |
| 2015/0375639 A1 * | 12/2015 | Yin | ............... | B60N 2/14 |
| | | | | 297/157.1 |
| 2015/0375640 A1 * | 12/2015 | Yin | ............... | B60N 2/206 |
| | | | | 297/157.1 |
| 2016/0039474 A1 * | 2/2016 | Murray | ............... | B62D 25/20 |
| | | | | 296/24.33 |
| 2017/0156493 A1 * | 6/2017 | Trujillo | ............... | A47B 46/00 |

\* cited by examiner

STOWABLE TABLE ASSEMBLY FOR A VEHICLE

TECHNICAL FIELD

This disclosure relates generally to a stowable table assembly and particularly, although not exclusively, relates to a stowable table assembly for a motor vehicle.

BACKGROUND

With the advent of electric and/or autonomous vehicles, the automotive designer is less restricted in the design of the passenger compartment. As a result, the seating arrangement and the placement of vehicle furniture in future vehicles may be different from that of a conventional vehicle. Furthermore, the seating arrangement in future vehicles may be reconfigurable depending on a passenger's requirements for a particular journey. It is desirable, therefore, to provide vehicle furniture that may be more conveniently stowed when not in use, and that can be positioned depending on the seating arrangement of the vehicle.

SUMMARY

According to a first aspect of the present disclosure, there is provided a stowable table assembly for a vehicle, the stowable table assembly comprising:

a cavity provided beneath a floor of the vehicle;

an elongate carrier coupled to side walls of the cavity, a first end of the carrier being configured to rotate and translate (e.g. slide) relative to the cavity between a stowed position, in which the carrier is stowed in the cavity, and a substantially upright position, in which the carrier extends from the cavity; and a table top coupled to the carrier, a first end of the table top being configured to translate (e.g. slide) and rotate relative to the carrier between an aligned position, in which the table top is aligned with the carrier, and an extended position, in which the table top is at an angle relative to the carrier (e.g. extending from a second end of the carrier), wherein the stowable table assembly is in a deployed configuration when the carrier is in the upright position and the table top is in the extended position, wherein the stowable table assembly is in a stowed configuration when the table top is in the aligned position and the carrier is in the stowed position, and wherein the carrier comprises at least one guide and the table top comprises at least one follower (e.g. at the first end of the table top) configured to be guided by the guide so as to guide movement of the table top relative to the carrier.

The carrier may rotate during the translation (e.g. a majority of the translation) between the stowed and upright positions. In other words, the translation and rotation may occur substantially concurrently when moving between the stowed and upright positions. By contrast, the table top may start to rotate towards or at the end of the translation when moving from the aligned position to the extended position. In reverse, the table top may first rotate before commencing translation when moving from the extended position to the aligned position.

The cavity (e.g. a structure within the cavity) may comprise at least one guide and the carrier may comprise at least one follower at the first end of the carrier. The carrier follower may be guided by the cavity guide such that the first end of the carrier may rotate and translate relative to the guide. The carrier may comprise first and second side walls. Each of the first and second side walls may comprise a pair of guides to guide movement of the table top.

The or one of the guides (e.g. a first guide on each of the carrier side walls) may comprise a curved end configured to provide a substantially horizontal surface for the corresponding follower to rest on and support the table top when the stowable table assembly is in the deployed configuration. The or one of the guides (e.g. a second guide on each of the carrier side walls) may comprise a curved portion configured to guide rotation of the table top relative to the carrier. The or one of the guides may comprise end stops for limiting travel of the corresponding table top follower.

The table top may rotate through approximately 180 degrees between the stowed and deployed configurations. The table top may rotate relative to the carrier about an axis that is parallel to an axis about which the carrier rotates relative to the cavity.

The table top may define a cantilever extending from the first end of the table top to a second (e.g. distal) end when the table top is in the extended position. The table top may extend from a second end of the carrier when in the deployed configuration.

The stowable table assembly may further comprise at least one folding table flap that may be rotatably coupled to the table top. A pair of such table flaps may be provided. The pair of table flaps may be provided at opposite edges of the table top. The table flap(s) may rotate relative to the table top about an axis, which is at an angle (e.g. perpendicular) to an axis about which the table top rotates relative to the carrier.

The stowable table assembly may further comprise a movable trap door configured to selectively cover an opening in the floor that leads to the cavity. The carrier and table top may pass through the opening when moving between the stowed and deployed configurations. The trap door may be flush with the floor in the stowed configuration. The trap door may be flush with the floor in the deployed configuration.

An end of the trap door may be set back from an end of the cavity opening when the trap door covers the opening and the carrier is in the substantially upright position. The carrier may extend through a gap between spaced apart ends of the trap door and opening.

The stowable table assembly may further comprise a trap door flap. The trap door flap may be movable between a first position that may cover the gap when the carrier is in the stowed position and a second position that may reveal the gap when the carrier is in the upstanding position. The trap door flap may be rotatably coupled to the trap door at the end of the trap door.

A vehicle, such as a motor vehicle, may comprise the aforementioned stowable table assembly. The first end of the carrier may move closer to a side wall of the vehicle when moving from the stowed position to the upright position. A second end of the carrier may follow an arc that may not intersect the side wall of the vehicle. Such an arrangement may minimise the intrusion on a cabin space when moving between the stowed and deployed configurations.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWING FIGURES

For a better understanding of the stowable table assembly, and to show more clearly how it may be carried into effect, reference will now be made, by way of example, to the accompanying drawings, in which:

FIGS. 4a, 4b, 4c and 4d (collectively FIG. 4) are end on schematic views of a table top according to an arrangement of the present disclosure and FIG. 4 depicts the progression of table flaps moving from a folded position (FIG. 4a) to an unfolded position (FIG. 4d).

DETAILED DESCRIPTION

With reference to FIG. 1, the present disclosure relates to a stowable table assembly 10 for a vehicle 20, such as a motor vehicle. The vehicle 20 comprises a cabin 22 for occupants of the vehicle. The cabin 22 is bounded by a floor 24a, side walls 24b and ceiling 24c. A cavity 26 is provided beneath the floor 24a of the vehicle 20. Components of the stowable table assembly 10 may be stowed within the cavity 26. A moveable trap door 28 may selectively cover the cavity 26. The trap door 28 may be flush with the surrounding floor 24a when the stowable table assembly 10 is in a stowed configuration as depicted in FIG. 1a. The trap door 28 may also be flush with the surrounding floor 24a when the stowable table assembly 10 is in a deployed configuration (as depicted in FIG. 1g). The trap door 28 may rotate relative to the floor 24 by virtue of pivot point 29 between the trap door 28 and floor 24a.

Figure 1A:
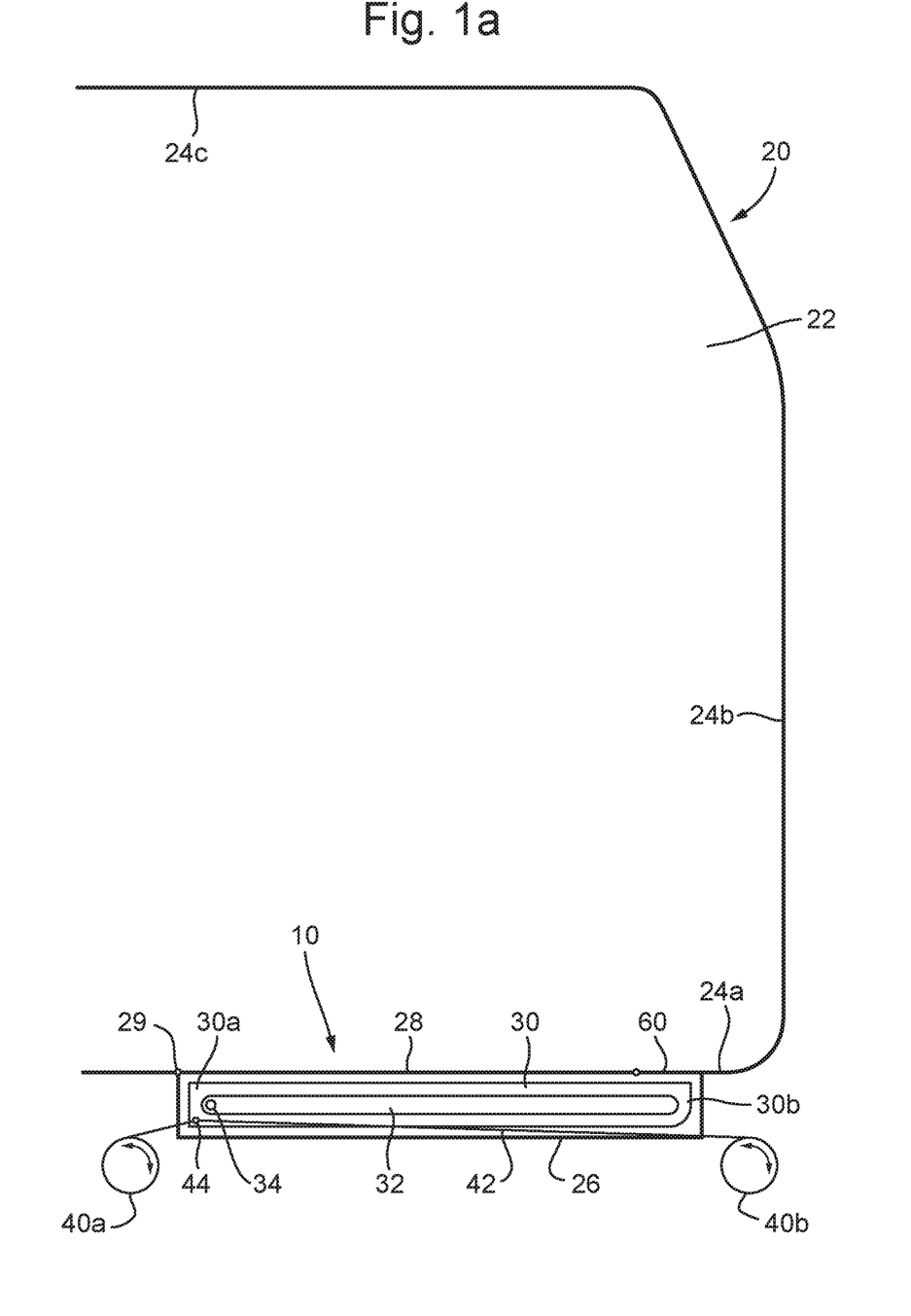
FIGS. 1a, 1b, 1c, 1d, 1e, 1f and 1g (collectively FIG. 1) are side schematic views depicting the progression of a stowable table assembly according to an arrangement of the present disclosure from a stowed configuration (FIG. 1a) to a deployed configuration (FIG. 1g)
Figure 1B:
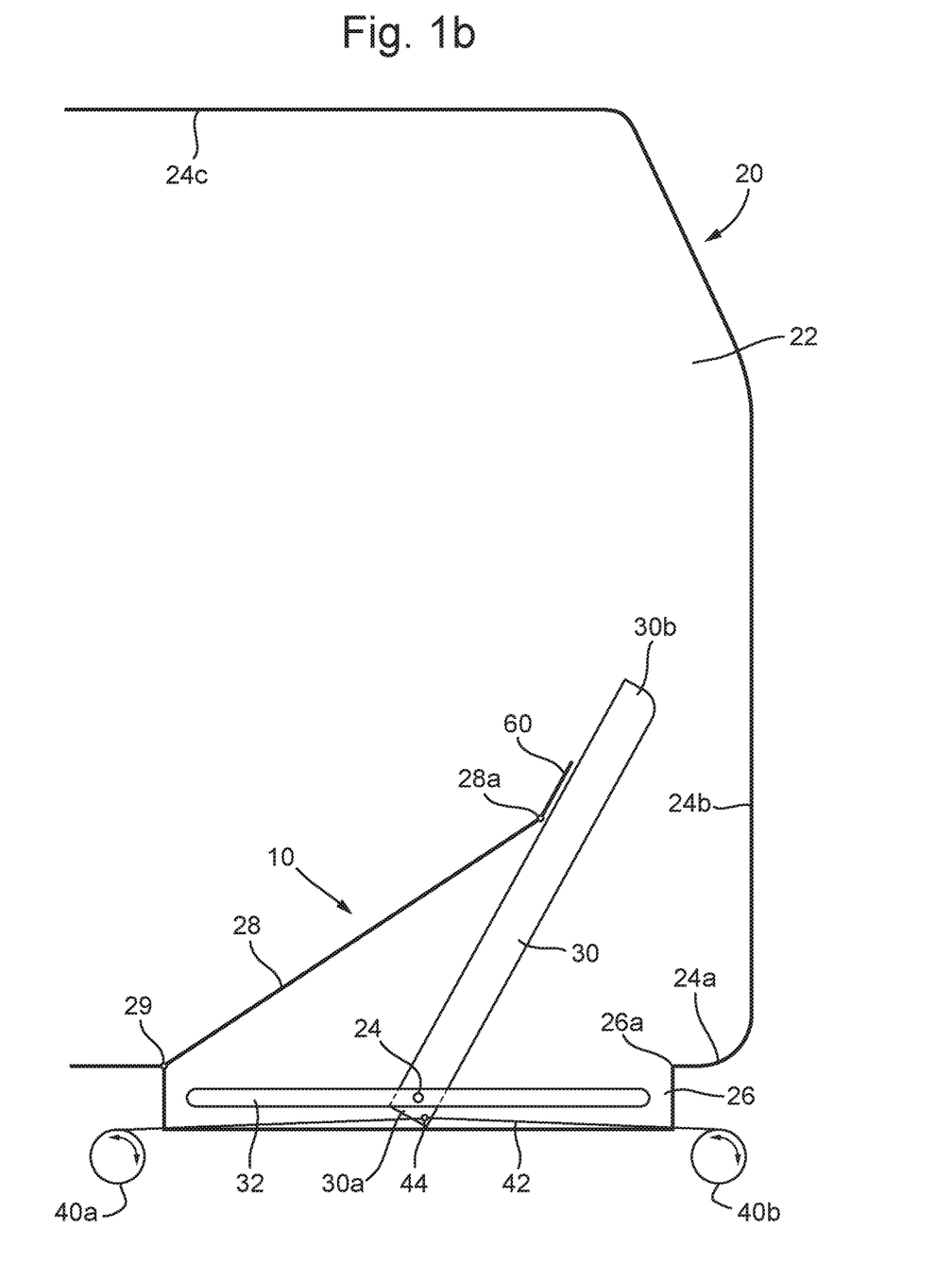
Figure 1C:
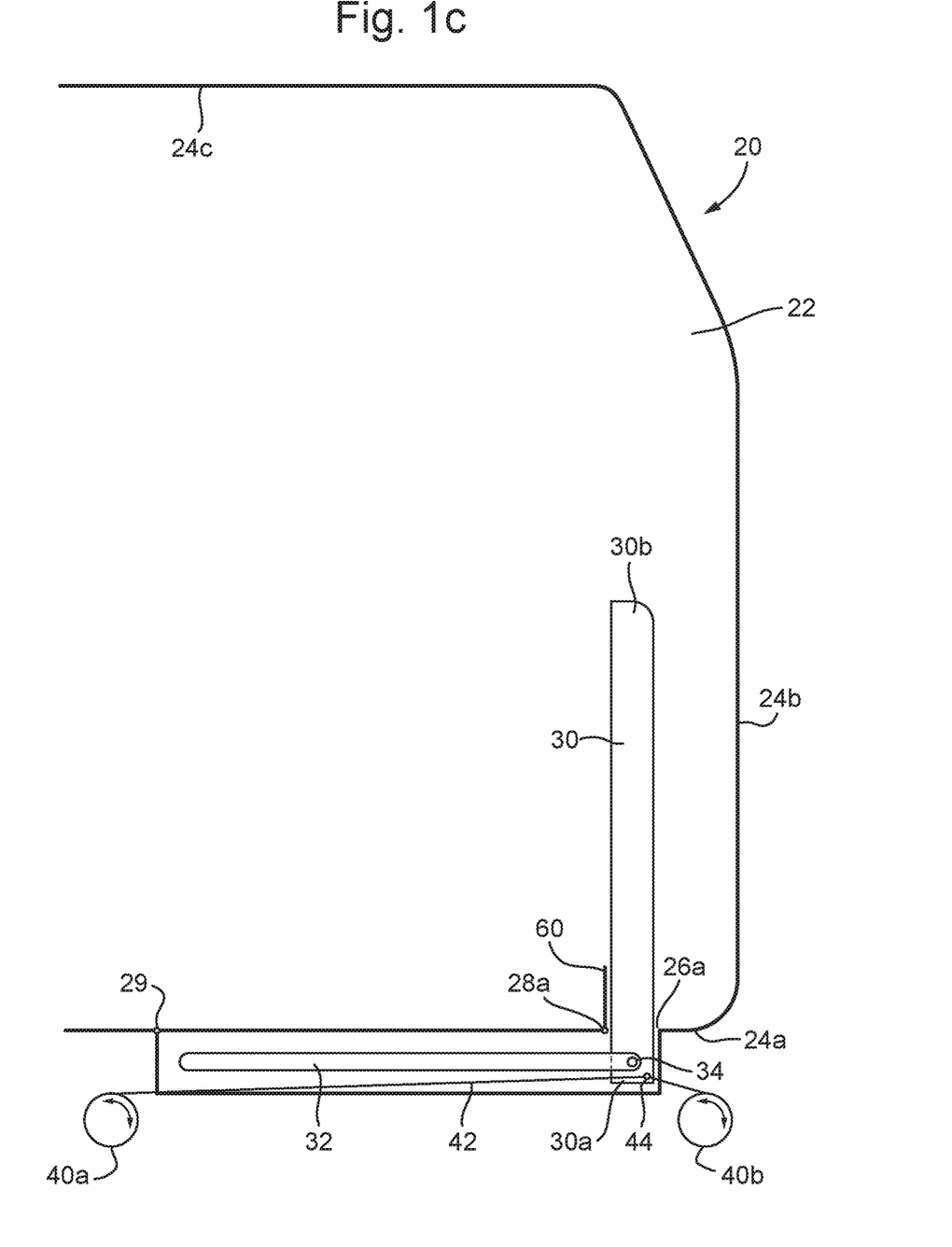

The stowable table assembly 10 comprises an elongate carrier 30. The carrier 30 is moveably coupled to the vehicle 20. In particular, the carrier 30 is coupled to side walls of the cavity 26. A first end 30a of the carrier 30 is configured to rotate and translate (e.g. slide) relative to the cavity 26. The cavity 26 comprises at least one table top guide 32, which may be in the form of a elongate slot in the side wall of the cavity 26. A corresponding slot may be provided in an opposite side wall of the cavity 26. The carrier 30 may comprise at least one follower 34 provided at the first end 30a of the carrier. The follower 34 may travel in the table top or cavity guide 32 so as to permit translation of the carrier 30 relative to the cavity 26. The follower 34 (or an intermediate part) may rotate relative to the guide 32 so as to permit rotation of the carrier 30 relative to the cavity 26. For example, the follower 34 may be in the form of a round pin that is free to rotate within the guide slot 32. A pair of followers 34 may be provided on opposing sides of the carrier 30 with each follower sliding in a corresponding guide 32. As depicted in FIGS. 1a, 1b and 1c, the guide 32 and follower 34 permit the carrier 30 to move between a stowed position, in which the carrier is substantially horizontal and stowed in the cavity 26 (as depicted in FIG. 1a), to a substantially upright position, in which the carrier 30 extends from the cavity 26 (as depicted in FIG. 1c). As the carrier moves from the stowed position to the upright position, the carrier 30 passes through an opening in the floor 24a that opens out into the cavity 26. FIG. 1b depicts such an intermediate position between the stowed and upright positions of the carrier and it will be apparent that the carrier 30 may rotate during the translation of the carrier between the stowed and upright positions. In other words, the translation and rotation of the carrier 30 may occur substantially concurrently when moving between the stowed and upright positions.

An actuator may be provided to facilitate movement of the carrier 30 between the stowed and upright positions. In the depicted arrangement, the stowable table assembly 10 may further comprise at least one pulley. For example, a pair of pulleys 40a, 40b may be provided. A flexible elongate member 42, such as a cable, may extend from the pulley(s) to the carrier 30. The pulley 40b may be positioned so that rotation of the pulley 40b causes the carrier 30 to move from the stowed position to the upright position. By contrast, the pulley 40a may be positioned so that rotation of the pulley 40a causes the carrier 30 to move from the upright position to the stowed position. The flexible elongate member 42 may be coupled to the first end 30a of the carrier 30. The flexible elongate member 42 may be coupled to the carrier at a point 44 that is spaced apart from the follower 34 and which is closest to the first end 30a. A force exerted by the flexible elongate member 42 may thus cause the carrier 30 to rotate about the follower 34. In this way, rotation of the pulley(s) may cause translation and rotation of the carrier 30. A motor may be connected to the pulley(s) so as to drive rotation of the pulley. It will be appreciated however, that other actuators may be provided. For example, a linear actuator may be coupled to the carrier 30 so as to cause the carrier 30 to translate and rotate.

Figure 1D:
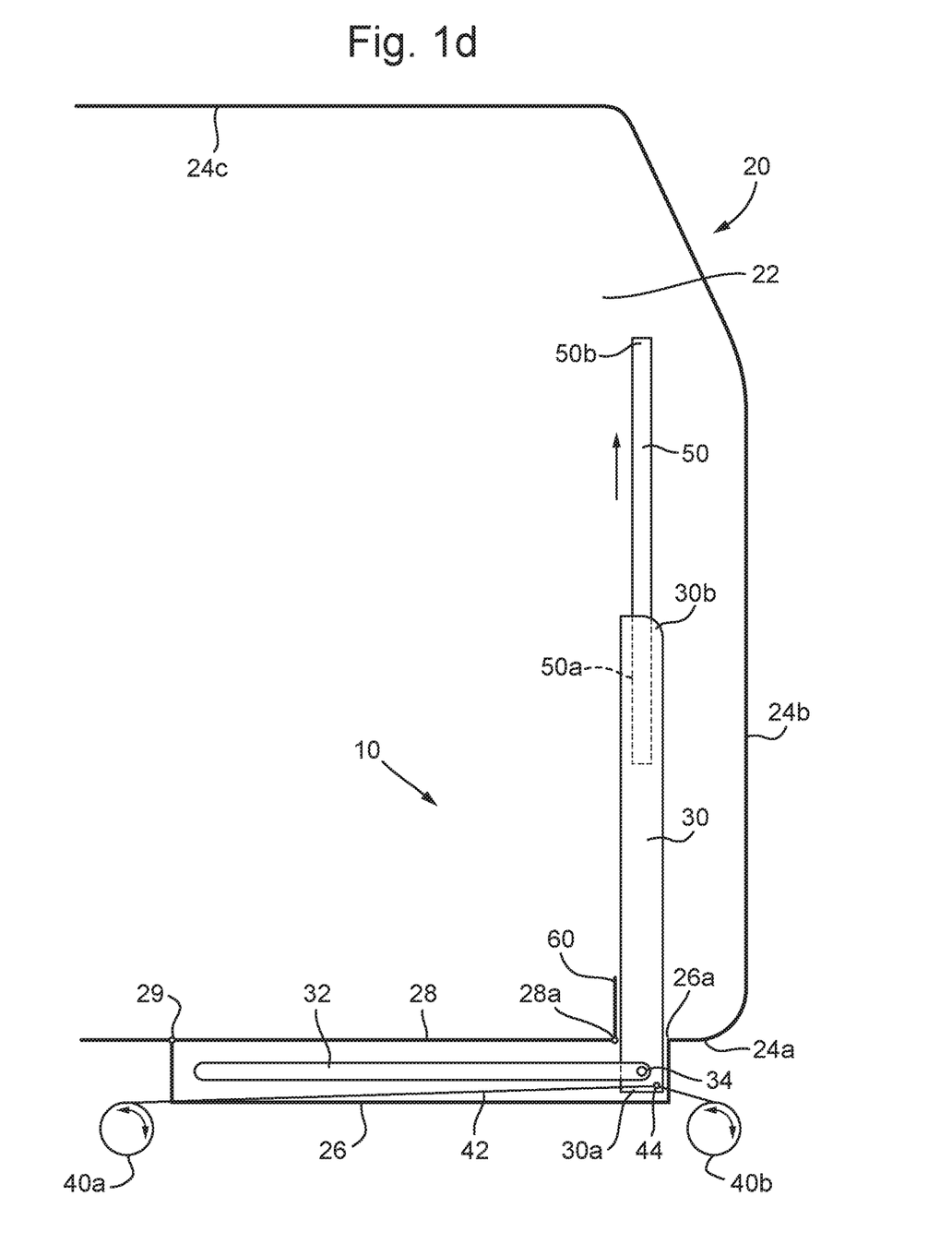
Figure 1E:
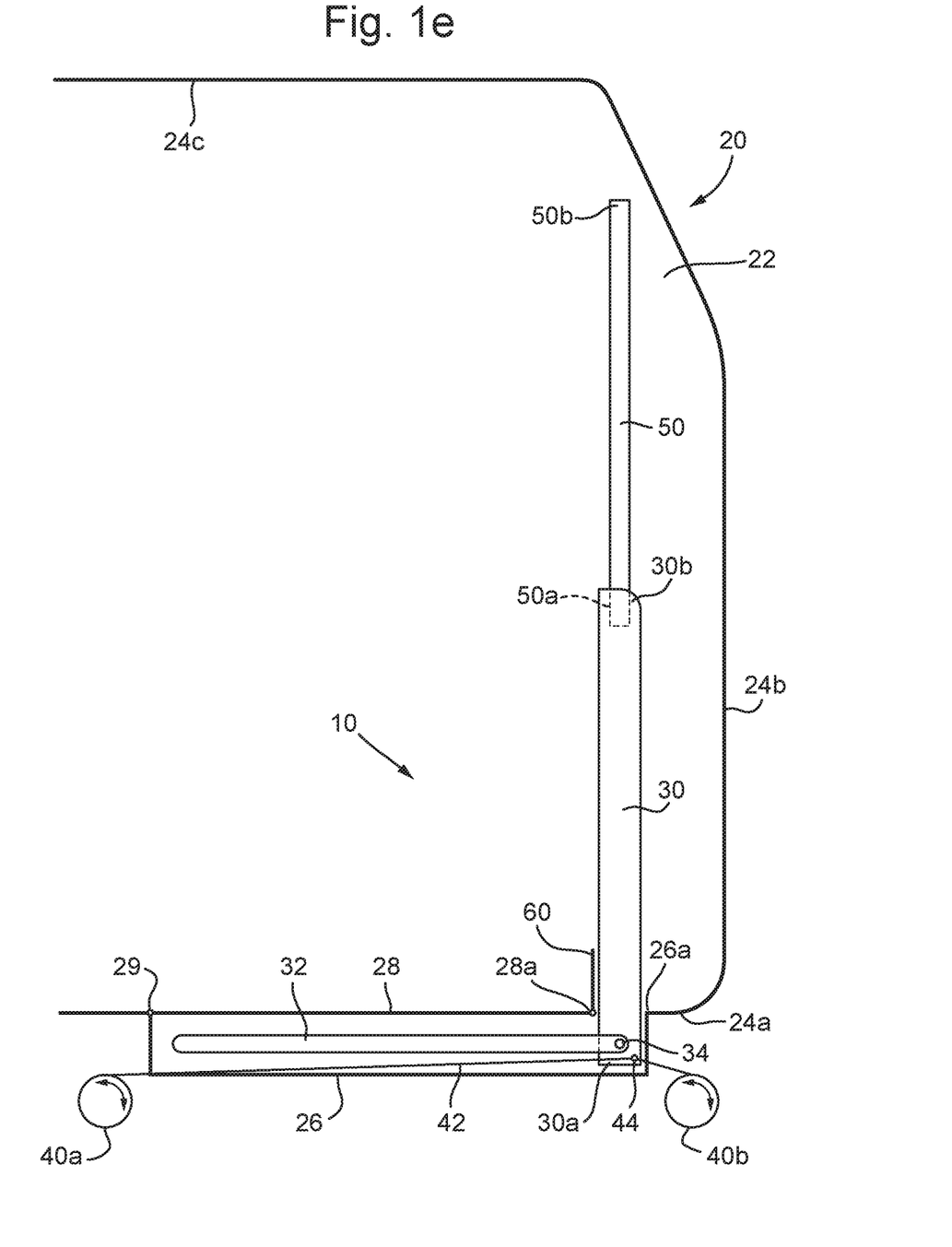
Figure 1F:
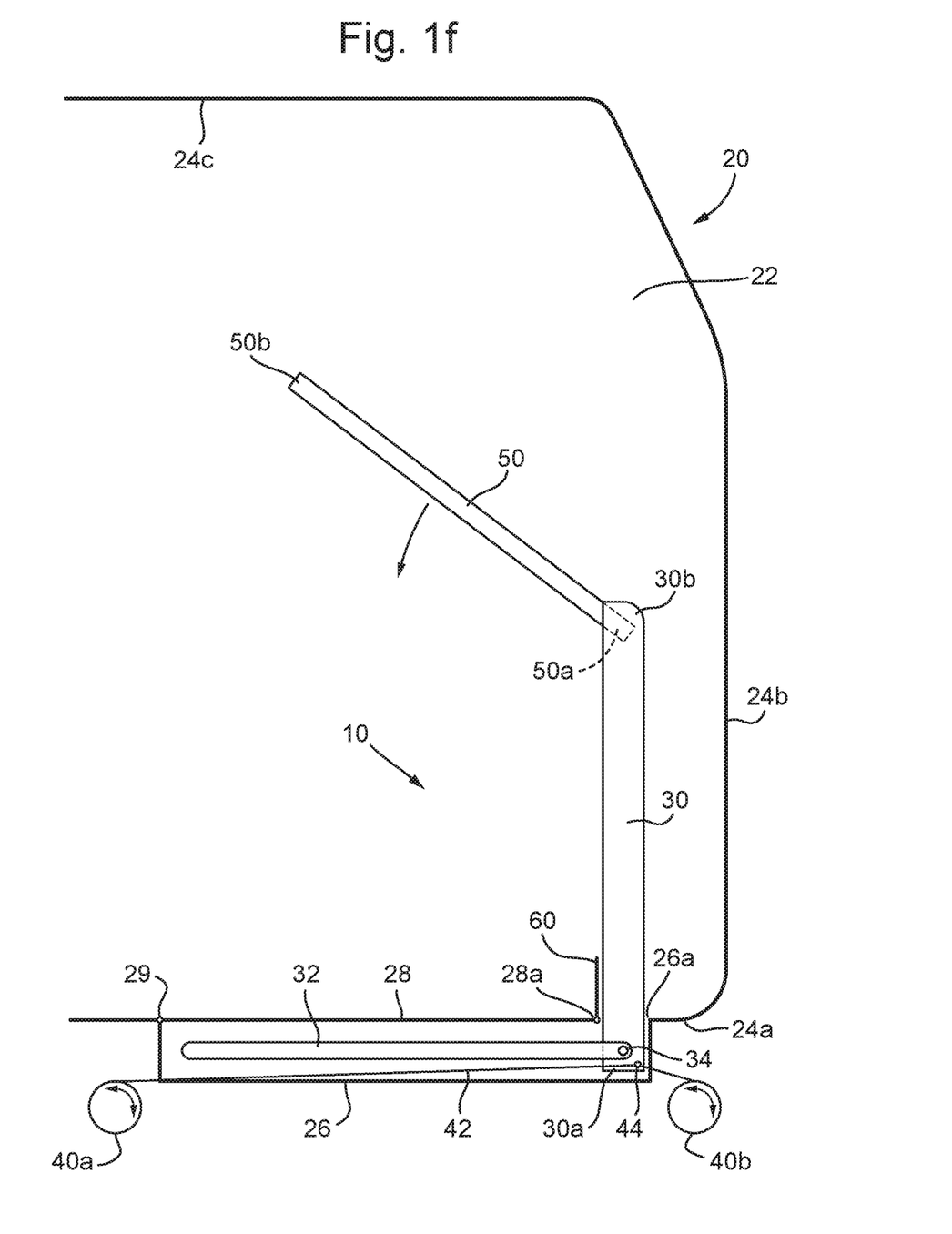
Figure 1G:
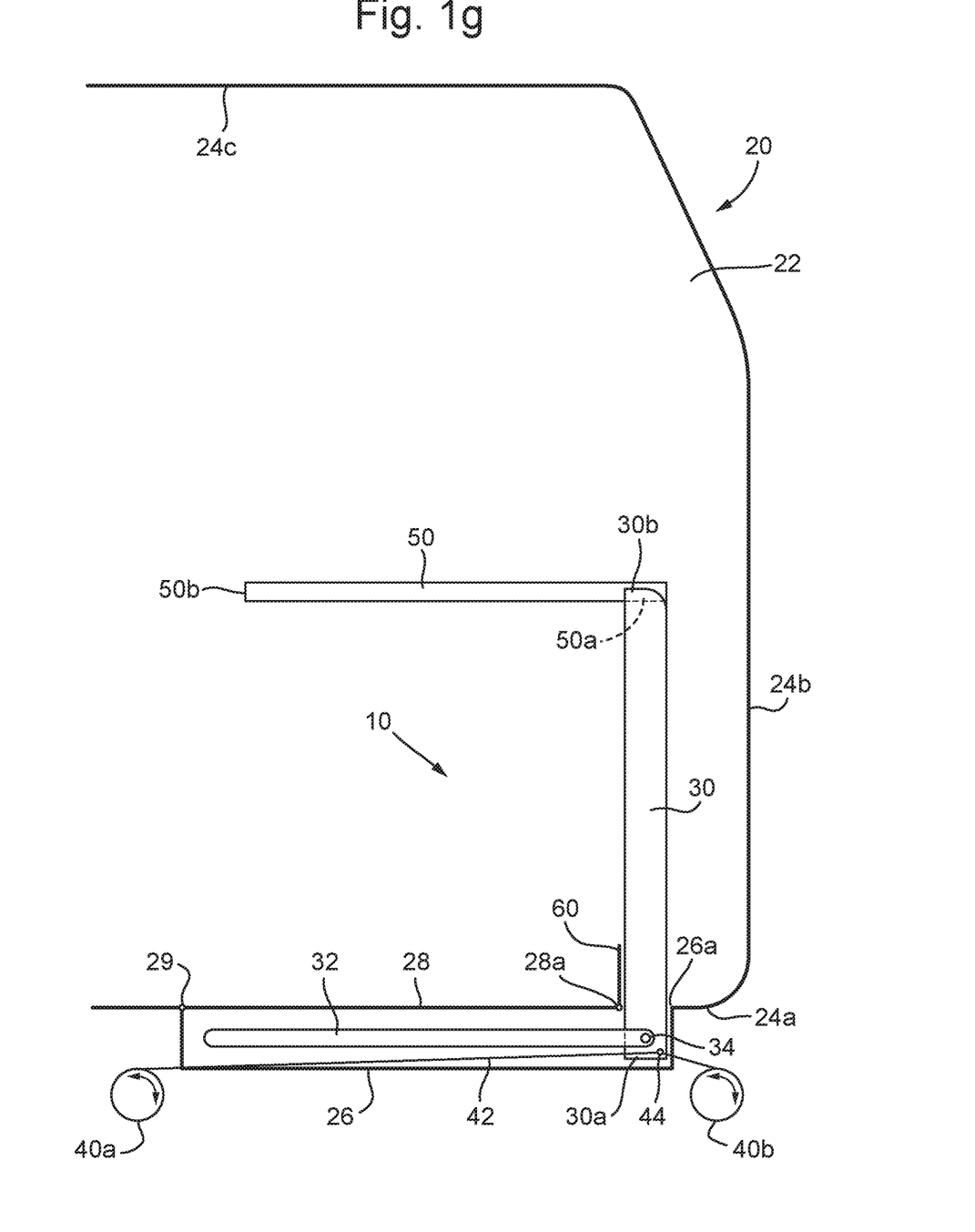

Referring now to FIGS. 1d-1g, the stowable table assembly 10 further comprises a table top 50. The table top 50 is moveably coupled to the carrier 30. A first end 50a of the table top is configured to translate (e.g. slide) and rotate relative to the carrier 30. The table top 50 may move from an aligned position (as depicted in FIG. 1d), in which the table top 50 is aligned with and stowed within the carrier 30, and an extended position (as depicted in FIG. 1g), in which the table top 50 is at an angle relative to the carrier 30. In particular, the table top 50 may retract into the carrier 30 and may reside within a space defined by the carrier 30. By contrast, in the extended position the table top 50 may extend from a second end 30b of the carrier such that the table top 50 defines a cantilever extending from the second end 30b of the carrier to a second (e.g. distal) end 50b of the table top. Longitudinal axes of the carrier 30 and table top 50 may be at approximately 90° to one another when the table top is in the extended position.

The table top 50 may rotate relative to the carrier 30 about an axis that is substantially parallel to an axis about which the carrier 30 rotates relative to the cavity 26. Furthermore, the table top 50 may rotate relative to the carrier 30 in the same direction as which the carrier 30 moves relative to the cavity 26 when the stowable table assembly 10 moves between the stowed and deployed configurations. Accordingly, the table top 50 may rotate through approximately 180° when moving between the stowed and deployed configurations.

It will be appreciated that the stowable table assembly 10 is in the deployed configuration when the carrier 30 is in the upright position and the table top 50 is in the extended position. By contrast, the stowable table assembly 10 is in the stowed configuration when the table top 50 is in the aligned position and the carrier 30 is in the stowed position.

Figure 2A:
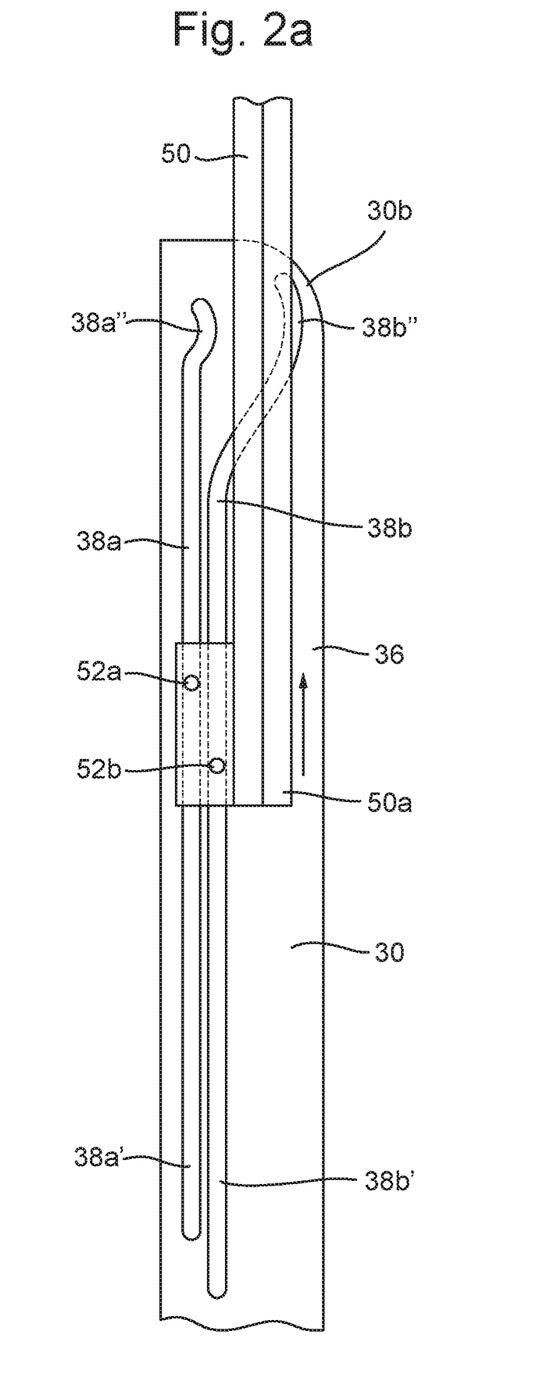
FIGS. 2a, 2b and 2c (collectively FIG. 2) are side schematic views depicting the progression of a table top moving from an aligned position (FIG. 2a) to an extended position (FIG. 2c) relative to a carrier of the stowable table assembly.
Figure 2B:
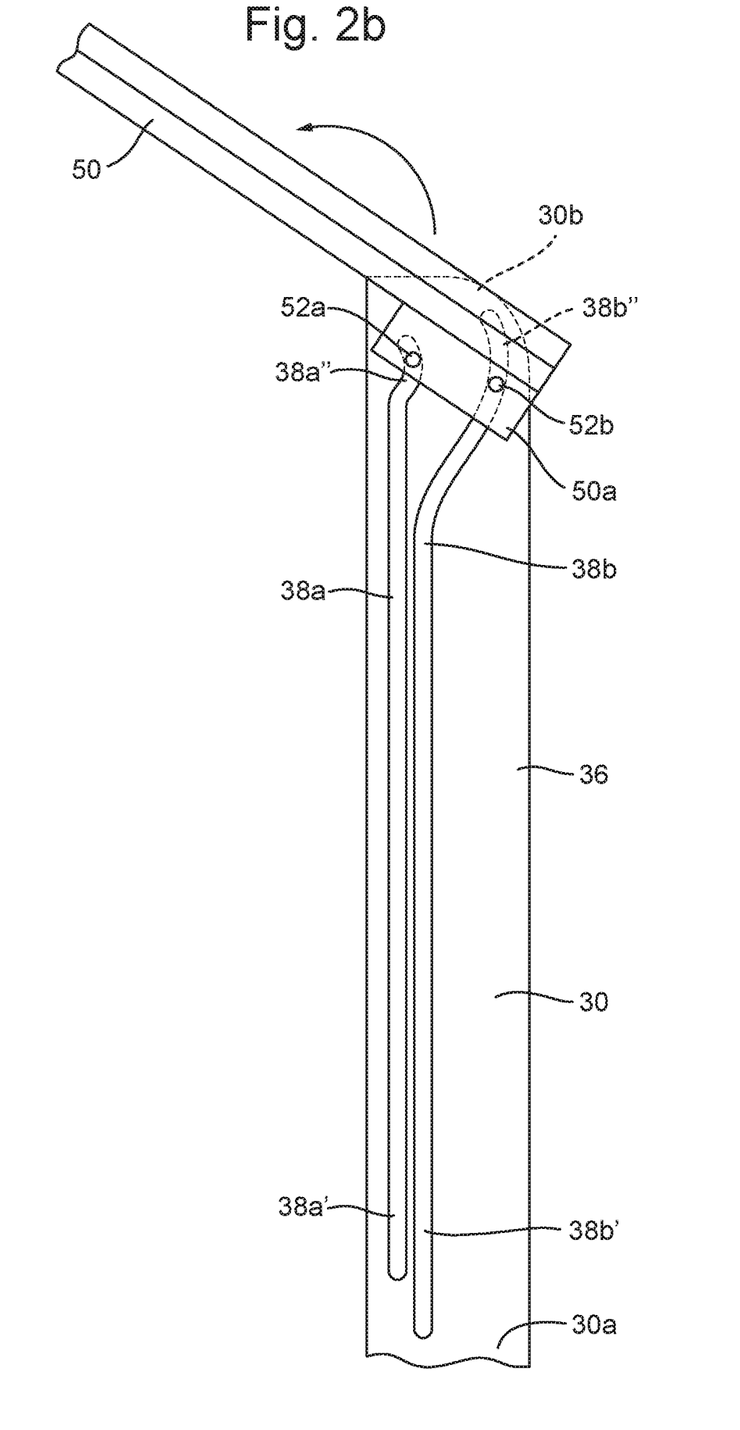
Figure 2C:
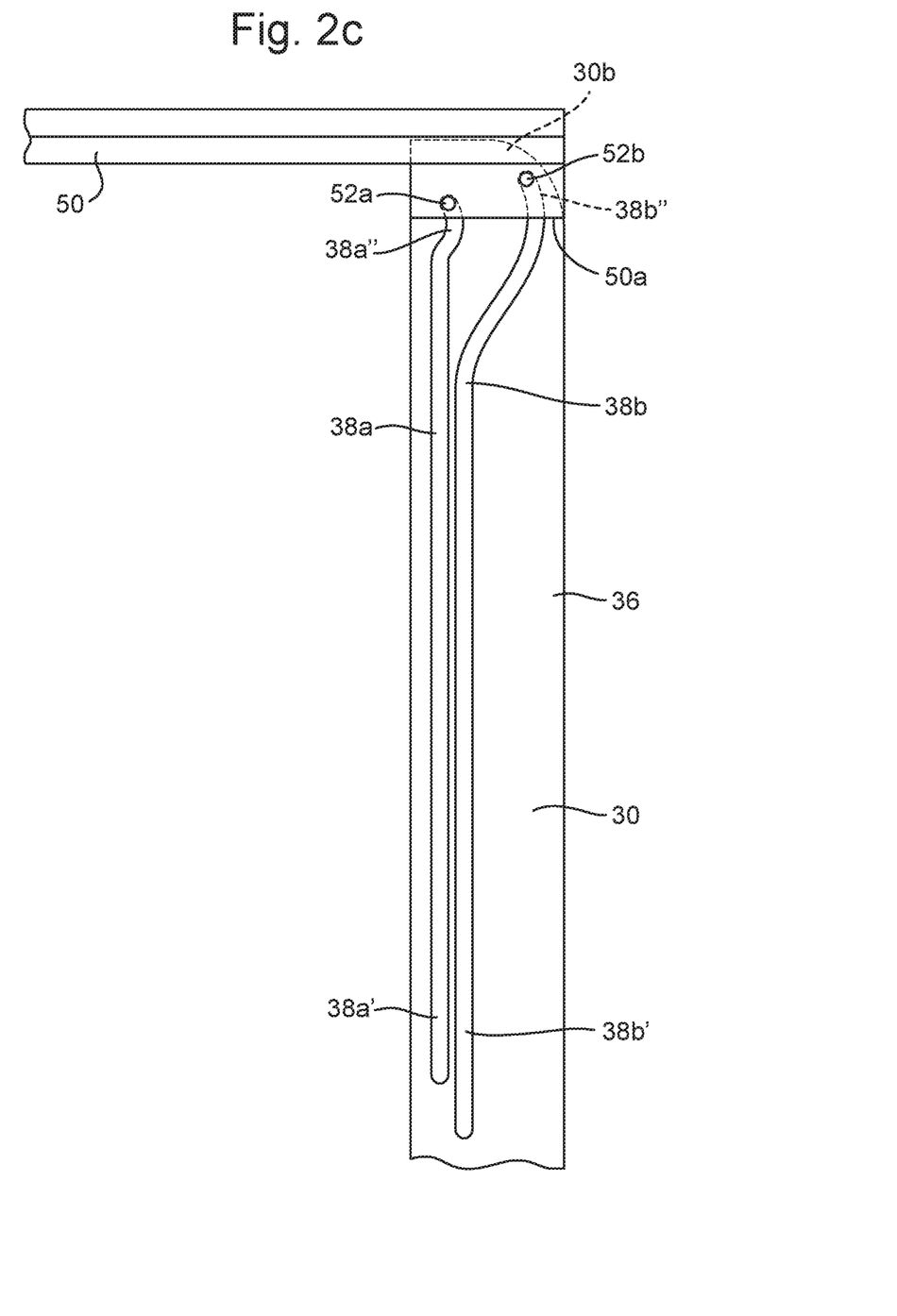

Referring now to FIG. 2, the carrier 30 may comprise at least one guide and the table top 50 may comprise at least one corresponding follower. The table top follower may be guided by the carrier guide so as to guide movement of the table top 50 relative to the carrier 30. In the particular arrangement shown, the carrier 30 may comprise first and second side walls 36, one of which is depicted in FIG. 2. The side walls 36 may extend in the longitudinal direction of the carrier 30 and the side walls may be laterally spaced apart so as to define a space in which the table top 50 may reside when in the aligned position. Each of the first and second side walls 36 may comprise a pair of guides 38a, 38b, which may be in the form of slots, to guide movement of the table top 50. Each side of the table top 50 comprises corresponding followers 52a, 52b, which are provided at the first end 50a of the table top, and which are configured to slide in the respective guides 38a, 38b. Each of the guides 38a, 38b may comprise end stops for limiting the travel of the corresponding table top followers 52a, 52b.

The guides 38a, 38b may be elongate and may extend side by side along a substantial portion of the length of the carrier side wall 36. Each of the guides 38a, 38b may comprise substantially straight portions 38a', 38b' which are substantially parallel to one another and which permit the table top 50 to translate relative to the carrier 30 as the respective followers 52a, 52b slide along the straight portions. The second guide 38b may comprise a curved portion 38b" at or near the second end 30b of the carrier. The curved portion 38b" of the guide 38b may cause the table top 50 to rotate as the follower 52b travels in the curved portion 38b".

The first guide 38a may comprise a hooked end 38a", which may be curved. As the table top 50 moves into the extended position as depicted in FIG. 2c, the hooked end 38a" may provide a substantially horizontal surface for the corresponding follower 52a to rest on and support the table top 50. In other words, the horizontal surface at the hooked end 38a" may provide an upwards force to the follower 52a. By contrast, an end of the second guide 38b at the second end 30b of the carrier may provide a downwards force to the follower 52b. These forces may provide a moment that supports the cantilever formed by the table top 50 when in the extended position.

FIG. 2a depicts the table top in the aligned position with the table top 50 mid-way through its translation in the straight portions 38a', 38b' of the guides 38a, 38b. FIG. 2b depicts the table top portion mid-way through the rotation relative to the carrier 30 during which the follower 52b travels in the curved portion 38b" of the guide 38b. FIG. 2c depicts the table top 50 in the extended position, in which the end stops of the guides 38a, 38b support the respective followers 52a, 52b so as to maintain the extended position of the table top. Owing to the shape of the guides 38a, 38b, it will be appreciated that the table top 50 first translates (e.g. moves in the linear direction) and then rotates when moving from the aligned position to the extended position.

Although not depicted, it will be appreciated that an actuator may be provided to move the table top 50 between the aligned and extended positions. For example, a linear actuator or rotary actuator, such as a motor, may be provided to urge movement between the two components. Alternatively, the table top 50 may be manually moved relative to the carrier 30 by an occupant of the vehicle 20.

Referring back to FIG. 1, an end 28a of the trap door 28 may be set back from an end 26a of the cavity 26. A gap may therefore exist between the trap door 28 and the end 26a of the cavity. The carrier 30 may pass through the gap between the ends 28a and 26a of the trap door 28 and cavity 26. The width of the gap may correspond to the width of the carrier 30. The end 28a of the trap door 28 and end 26a of the cavity 26 may thus assist in holding the carrier 30 in place when in the upright position.

Referring still to FIG. 1, the stowable table assembly 10 may further comprise a trap door flap 60. The trap door flap 60 may be moveably coupled to the trap door 28, for example the trap door flap 60 may be pivotably connected to the trap door 28 at the end 28a of the trap door. The trap door flap may cover the gap between the end 28a of the trap door and the end 26a of the cavity when the carrier 30 is in the stowed position. The trap door flap 60 may move so as to reveal the gap when the carrier 30 is in the upstanding position. The trap door flap 60 may be substantially flush with the surrounding trap door 28 and floor 24a when covering the gap.

Figure 3:
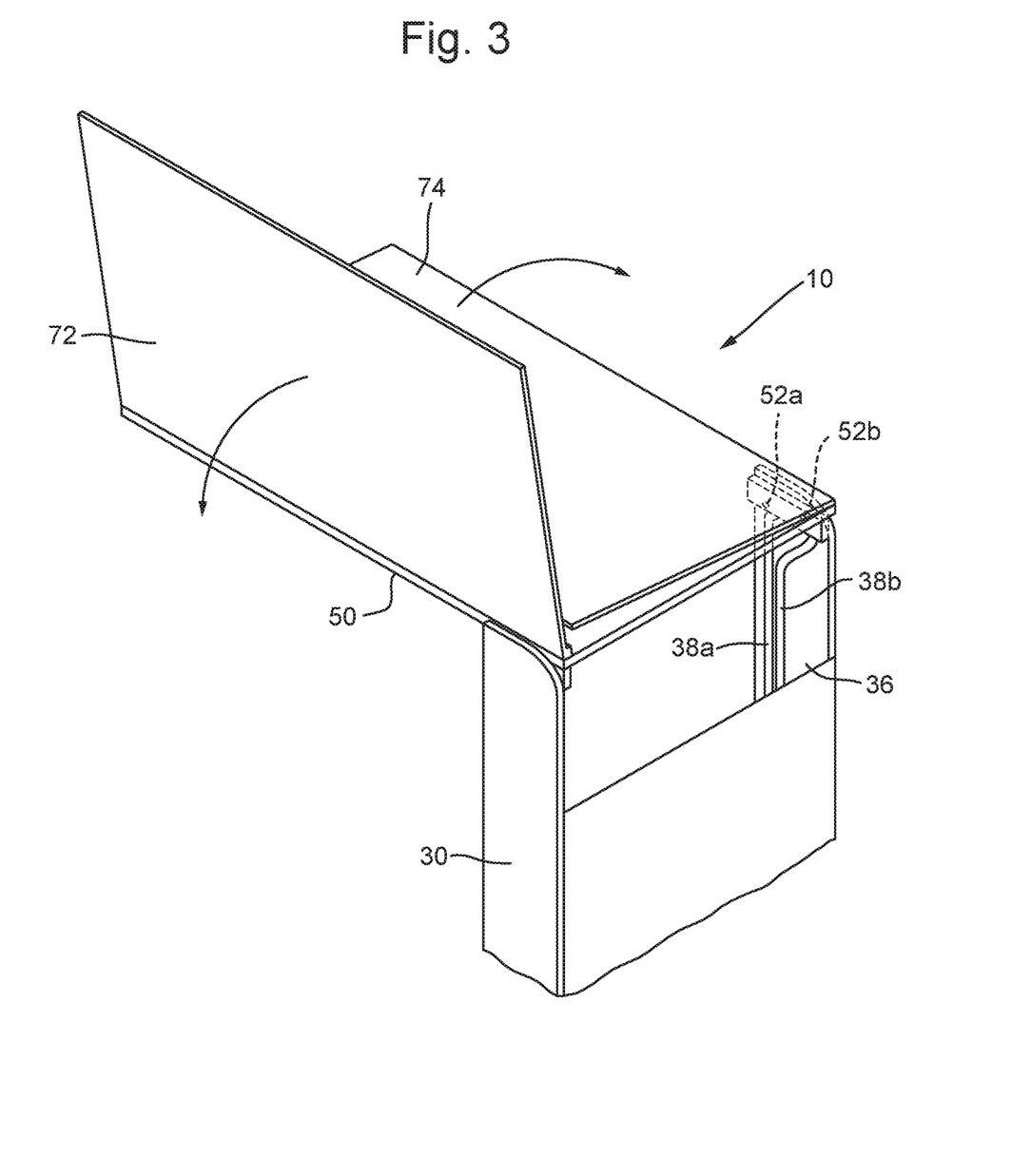
FIG. 3 is a perspective view of the stowable table assembly according to the arrangement of the present disclosure in the deployed configuration.
Figure 4A:
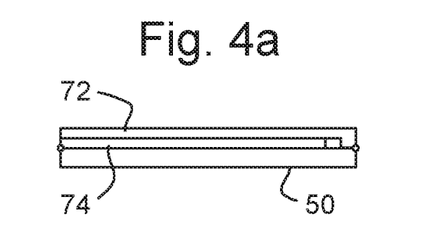
Figure 4B:
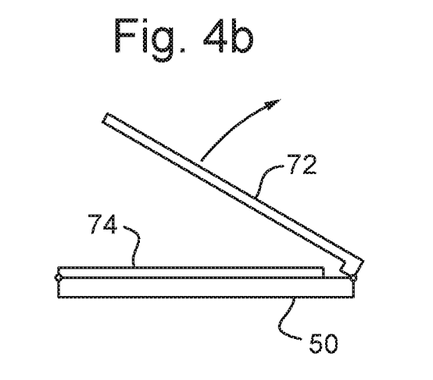
Figure 4C:
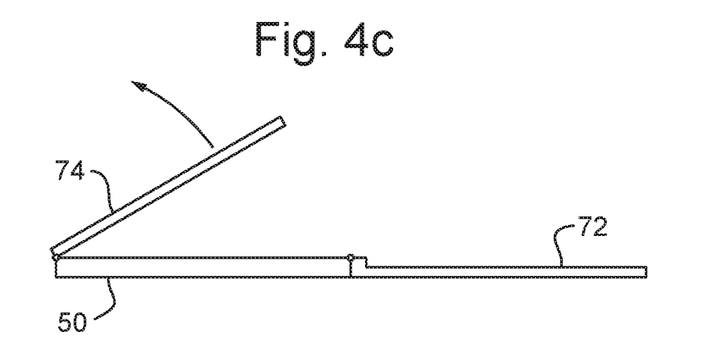
Figure 4D:
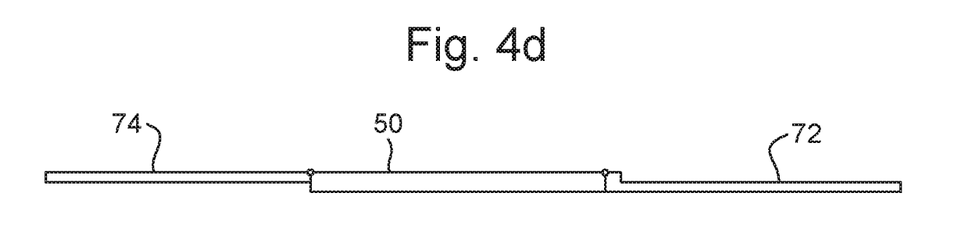

Referring now to FIGS. 3 and 4, the stowable table assembly 10 may further comprise at least one folding table flap that may be rotatably coupled to the table top 50. By way of example, the stowable table assembly may comprise a first table flap 72 and a second table flap 74. The first table flap 72 may be rotatably coupled to the table top 50 along a lengthwise edge of the table top 50. The second table flap 74 may be rotatably coupled to the opposite lengthwise edge of the table top 50. The first and second table flaps 72, 74 may rotate about axes that are spaced apart from one another. The first and second table flaps 72, 74 may also rotate about axes that are substantially perpendicular to the axis about which the table top 50 rotates relative to the carrier 30.

FIG. 4 depicts how the table flaps 72, 74 may be unfolded relative to the table top 50. As depicted in FIG. 4a, the first and second table flaps 72, 74 may be folded in on each other. The first table flap 72 may then be unfolded to reveal the second table flap 74 which may then also be unfolded. When both table flaps have been unfolded (as depicted in FIG. 4d) a larger table surface is presented to the occupants of the vehicle. The table flaps 72, 74 may be folded in the reverse order so as to return the table flaps to their folded positions. When the first and second table flaps 72, 74 are in the folded position, the table top 50 may be retracted into the aligned position relative to the carrier 30.

FIGS. 1a-1g depict the sequence of events as the stowable table assembly 10 is moved from the stowed configuration to the deployed configuration. First, the carrier 30 is moved away from the stowed position, e.g. by virtue of movement of pulleys 40a, 40b. The second end 30b of the carrier 30 moves upwards and the first end 30a of the carrier moves laterally across, e.g. towards the side wall 24b of the vehicle. The trap door 28 may be displaced as the carrier 30 moves from the stowed position to the upright position. However, once the carrier 30 is in the upright position the trap door 28 may return to its original position, although the trap door flap 60 may be displaced so as to allow the carrier 30 to protrude through the cavity opening. The table top 50 may then be retracted from the carrier 30. The table top 50 may initially move linearly and may then rotate into a horizontal position, e.g. as depicted in FIG. 1g and FIG. 3. The table flaps 72, 74 (if provided) may then be unfolded to increase the surface area of the resulting table. This procedure may then be reversed in order to return the stowable table assembly into the stowed configuration.

The present disclosure advantageously provides a stowable table assembly 10 that can be deployed from the floor 24a of a vehicle 20. The movement of the carrier 30 and table top 50 minimizes the incursion into the cabin space and also avoids any unwanted interactions with the side wall 24b or ceiling 24c of the vehicle.

It will be appreciated by those skilled in the art that although the stowable table assembly 10 has been described by way of example, with reference to one or more examples, it is not limited to the disclosed examples and alternative examples may be constructed without departing from the scope of the stowable table assembly as defined by the appended claims.

What is claimed:

1. A stowable table assembly for a vehicle, the stowable table assembly comprising:
   a cavity provided beneath a floor of the vehicle;
   a carrier coupled to side walls of the cavity, a first end of the carrier being configured to rotate and translate relative to the cavity between a substantially horizontal stowed position, in which the carrier is stowed in the cavity, and a substantially vertical upright position, in which the carrier extends from the cavity;
   a table top selectively disposed within and coupled to the carrier, a first end of the table top being configured to translate and rotate relative to the carrier between an aligned position, in which the table top is aligned with the carrier, and an extended position, in which the table top is at an angle relative to the carrier; and
   a flexible elongate member operably coupled to the carrier and configured to rotatably translate the carrier relative to the floor,
   wherein the carrier comprises at least one table top guide and the table top comprises at least one follower configured to be guided by the guide so as to guide movement of the table top relative to the carrier.

2. The stowable table assembly of claim 1, wherein the cavity comprises a guide and the carrier comprises a follower at the first end of the carrier, the follower being guided by the guide so that the first end of the carrier rotates and translates relative to the guide.

3. The stowable table assembly of claim 2, wherein the at least one table top guide comprises a curved portion configured to guide rotation of the table top relative to the carrier.

4. The stowable table assembly of claim 3, wherein the stowable table assembly is in a deployed configuration when the carrier is in the upright position and the table top is in the extended position and is in a stowed configuration when the table top is in the aligned position and the carrier is in the stowed position.

5. The stowable table assembly of claim 4, wherein the at least one table top guide comprises a curved end configured to provide a substantially horizontal surface for the follower to rest on and support the table top when the stowable table assembly is in the deployed configuration.

6. The stowable table assembly of claim 5, wherein the carrier comprises first and second side walls, each of the first and second side walls comprising a pair of table top guides to guide movement of the table top.

7. The stowable table assembly of claim 6, wherein the table top rotates through approximately 180 degrees between the stowed and deployed configurations.

8. The stowable table assembly of claim 6, wherein the table top rotates relative to the carrier about a first axis that is parallel to a second axis about which the carrier rotates relative to the cavity.

9. The stowable table assembly of claim 8, wherein the table top defines a cantilever extending from the first end of the table top to a distal end when the table top is in the extended position.

10. The stowable table assembly of claim 9, wherein the stowable table assembly further comprises at least one folding table flap that is rotatably coupled to the table top.

11. The stowable table assembly of claim 10, wherein the at least one folding table flap rotates relative to the table top about a third axis, which is at an angle to the second axis about which the table top rotates relative to the carrier.

12. The stowable table assembly of claim 11, wherein the stowable table assembly further comprises a movable trap door configured to selectively cover an opening in the floor that leads to the cavity.

13. The stowable table assembly of claim 12, wherein the trap door is flush with the floor in the stowed and deployed configurations.

14. The stowable table assembly of claim 13, wherein an end of the trap door is set back from an end of the cavity opening when the trap door covers the opening and the carrier is in the substantially upright position with the carrier extending through a gap between spaced apart ends of the trap door and the opening.

15. The stowable table assembly of claim 14, wherein the stowable table assembly further comprises a trap door flap, the trap door flap being movable between a first position that covers the gap when the carrier is in the stowed position and a second position that reveals the gap when the carrier is in the upstanding position.

* * * * *